(12) United States Patent
Sands et al.

(10) Patent No.: US 6,852,050 B2
(45) Date of Patent: Feb. 8, 2005

(54) LATERAL SENSOR FOR CONVEYOR BELT

(75) Inventors: Jeffrey L. Sands, Freeport, IL (US); Ronald J. Glavan, Rockton, IL (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 53 days.

(21) Appl. No.: 10/124,622

(22) Filed: Apr. 17, 2002

(65) Prior Publication Data
US 2003/0199349 A1 Oct. 23, 2003

(51) Int. Cl.[7] ............................................. F16H 7/08
(52) U.S. Cl. ............................. 474/110; 198/810.03
(58) Field of Search ........................ 474/101, 102, 474/103, 110; 198/810.03; 99/443 C, 443 R

(56) References Cited

U.S. PATENT DOCUMENTS

| | | | |
|---|---|---|---|
| 3,545,599 A | | 12/1970 | Smith et al. |
| 3,621,987 A | | 11/1971 | Sherwood |
| 4,959,040 A | * | 9/1990 | Gardner et al. ............ 474/103 |
| 4,961,089 A | | 10/1990 | Jamzadeh |
| 5,153,655 A | * | 10/1992 | Suzuki et al. ............. 399/329 |
| 5,157,444 A | * | 10/1992 | Mori et al. ............... 399/329 |
| 5,316,524 A | * | 5/1994 | Wong et al. .............. 474/151 |
| 5,394,222 A | * | 2/1995 | Genovese ................. 399/167 |
| 5,515,139 A | | 5/1996 | Hou et al. |
| 5,630,358 A | * | 5/1997 | Patel ........................ 99/349 |
| 5,838,359 A | * | 11/1998 | Hoover ..................... 347/250 |
| 5,964,339 A | * | 10/1999 | Matsuura et al. ...... 198/810.03 |
| 6,141,525 A | * | 10/2000 | Tahara ..................... 399/395 |
| 6,575,857 B2 | * | 6/2003 | Sebright et al. ........... 474/106 |

FOREIGN PATENT DOCUMENTS

| | | |
|---|---|---|
| DE | 201 02 365 | 6/2001 |
| EP | 0 989 079 | 3/2000 |

OTHER PUBLICATIONS

International Search Report dated Aug. 5, 2003.

* cited by examiner

*Primary Examiner*—David A. Bucci
*Assistant Examiner*—Vicky A Johnson
(74) *Attorney, Agent, or Firm*—Carlson, Gaskey & Olds

(57) ABSTRACT

A lateral sensor positioned proximate to at least one of the edges of a conveyor belt continually monitors the position of the edge of the conveyor belt. If lateral movement is detected by the lateral sensor, an adjustment motor rotates to move an end of a non-drive pulley to adjust for the lateral movement. The lateral sensor can be a non-contacting inductive proximity sensor, a proportional sensor such as a linear variable displacement transducer or a linear potentiometer which determines if the edge of the conveyor belt has moved laterally by monitoring the resistance in the spring, or a Hall effect sensor.

9 Claims, 3 Drawing Sheets

LATERAL SENSOR FOR CONVEYOR BELT

BACKGROUND OF THE INVENTION

The present invention relates generally to a lateral sensor which monitors the position of an edge of a conveyor belt and sends a signal to a control to automatically adjust the conveyor belt to accommodate for any lateral movement of the conveyor belt.

A continuous conveyor belt is employed to move objects from one location to another. The conveyor belt is positioned around a plurality of pulleys, and at least one of the pulleys is driven by a motor. As the motor drives the pulley, the pulley rotates to move the conveyor belt, moving the objects positioned on the conveyor belt from one location to another.

Conveyor belts are used in various settings, such as retail stores to move merchandise, air ports to move luggage, and factories to move parts. Conveyor belts have also been employed in grills to cook foods. The food is manually placed on the conveyor belt by an operator. As the conveyor belt travels over a heater positioned under the conveyor belt, the food is cooked.

As a conveyor belt moves, the conveyor belt may move laterally and slide off of the pulleys. Devices have been used in the prior art to adjust the tension of the conveyor belt to provide for proper tension. However, it would be beneficial to provide a device which monitors the lateral position of the conveyor belt and adjusts the conveyor belt when lateral movement is detected.

SUMMARY OF THE INVENTION

A conveyor belt system includes a conveyor belt which travels over a drive pulley an opposing non-drive pulley. The drive pulley is driven by a drive motor to move the conveyor belt. The non-drive pulley is controlled by an adjustment motor which is used to adjust the lateral position of the conveyor belt.

During operation of the conveyor belt system, it may be possible for the conveyor belt to move laterally and slide off the pulleys. In the present invention, a sensor positioned proximate to each of the two edges of the conveyor belt to continually monitor the position of the edges. If lateral movement is detected by one of the lateral sensors, the adjustment motor rotates to move an end of the non-drive pulley to move the conveyor belt back to a desired position. The lateral sensor in one example is a non-contacting inductive proximity sensor. Alternatively, only one lateral sensor is utilized proximate to one of the edges.

Alternatively, the lateral sensor includes a proportional sensor, such as a linear variable displacement transducer or a linear potentiometer. A spring is positioned around a shaft and provides resistance to a yoke. A rotatable wheel having a groove is secured to the yoke by a rod, the groove contacting the edge of the conveyor belt. By monitoring the resistance in the spring, the proportional sensor determines if the edge of the conveyor belt has moved laterally. If a change in resistance in the spring is detected, the conveyor belt is moved laterally an amount proportional to the change in resistance of the spring.

Alternatively, the lateral sensor includes a Hall effect sensor. The edge of the conveyor belt is positioned in a channel in the lateral sensor. As the edge of the conveyor belt moves laterally in the channel, the Hall effect sensor detects a change in a magnetic field, indicating that the edge of the conveyor belt has moved laterally.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DESCRIPTION OF THE PREFERRED EMBODIMENT

Figure 1:
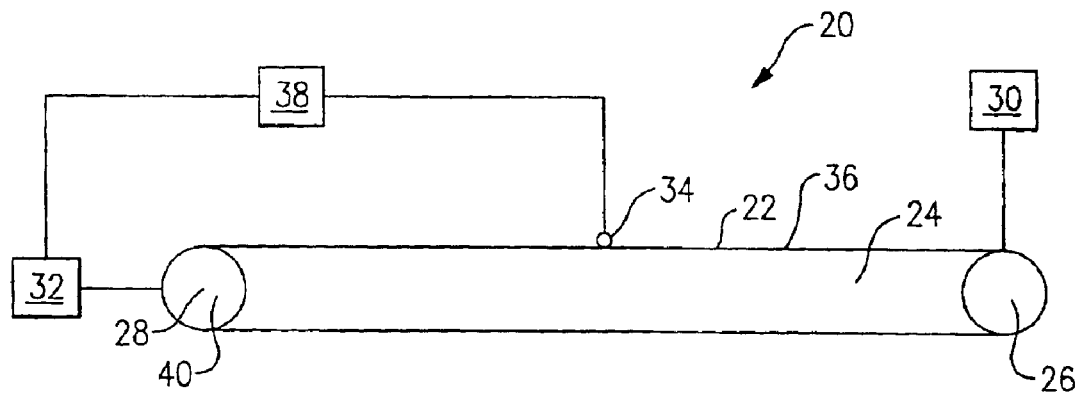
FIG. 1 schematically illustrates a side view of a conveyor belt system including a lateral sensor.
Figure 2:
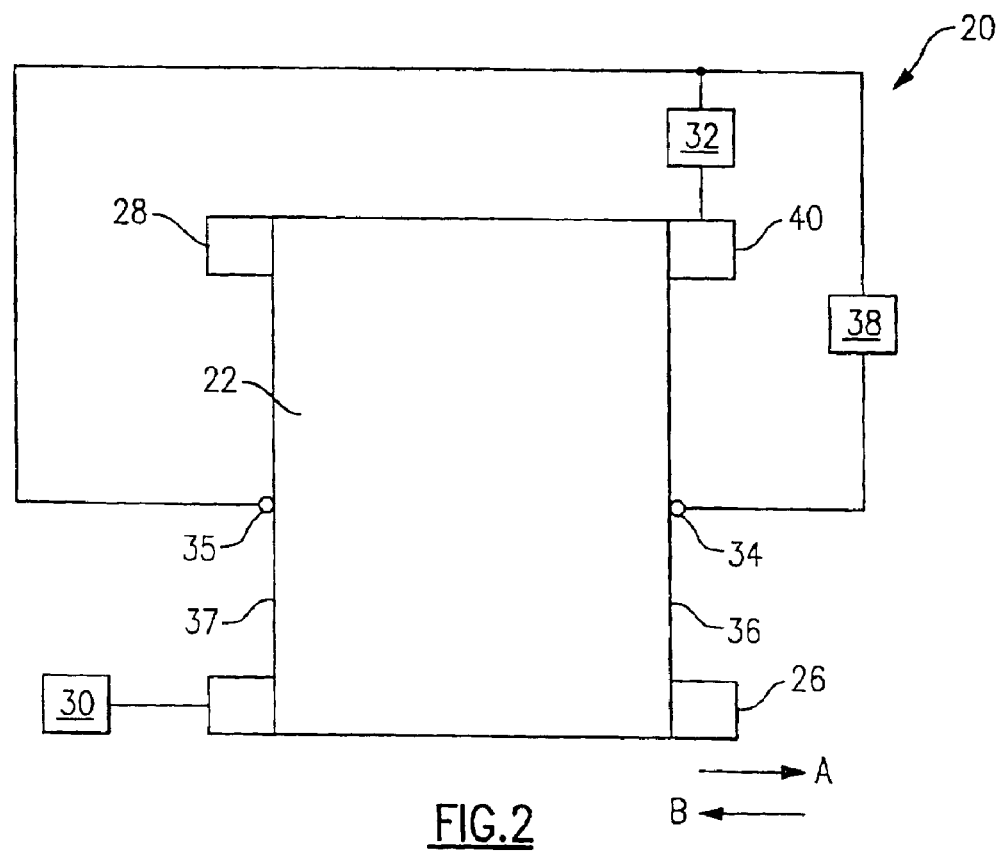
FIG. 2 schematically illustrates a top view of the conveyor belt system including the lateral sensor.

FIGS. 1 and 2 schematically illustrate a conveyor belt system 20. The system 20 includes a conveyor belt 22 which travels around a structure 24, a drive pulley 26, and an opposing non-drive pulley 28. A drive motor 30 drives the drive pulley 26 to move the conveyor belt 22 over the structure 24. The non-drive pulley 28 is controlled by an adjustment motor 32. Although only two pulleys 26 and 28 have been illustrated and disclosed, it is to be understood that additionally pulleys 26 and 28 can be employed in the conveyor belt system 20.

During operation of the conveyor belt system 20, it may be possible for the conveyor belt 22 to move laterally in the directions A or B (i.e, right or left, respectively, as shown in FIG. 2) and slide off of the pulleys 26 and 28. Lateral sensors 34 and 35 positioned proximate to each of the respective edges 36 and 37 of the conveyor belt 22 continually monitor the position of the edges 36 and 37. If lateral movement is detected by the lateral sensor 34 or 35, a controller 38 sends a signal to the adjustment motor 32 to move an end 40 of the non-drive pulley 28 to adjust for the lateral movement. Preferably, the lateral sensors 34 or 35 in one example is a non-contacting inductive proximity sensor. The adjustment motor 32 rotates to move the end 40 of the non-drive pulley 28 to return the conveyor belt 22 to the desired position.

As shown in FIG. 2, if the conveyor belt 22 has moved in the direction A (i.e., to the right in FIG. 2), the lateral sensor 35 does not sense the edge 37 of the conveyor belt 22. The controller 38 then sends a signal to the adjustment motor 32 which rotates to raise the end 40 of the non-drive pulley 28 and move the conveyor belt 22 in the direction B (i.e., to the left in FIG. 2). After a predetermined amount of time, the lateral sensor 35 again tries to detect the presence of the edge 37 of the conveyor belt 22. If the edge 37 of the conveyor belt 22 is detected, no further adjustment is needed. If the edge 37 of the conveyor belt 22 is not detected, the adjustment motor 32 rotates again to raise the end 40 of the non-drive pulley 28 to again move the conveyor belt 22 in the direction B. This is repeated until the conveyor belt 22 is detected by the sensor 35

Alternatively, if the conveyor belt 22 has moved in the direction B (i.e., to the left in FIG. 2), the lateral sensor 34 does not sense the edge 36 of the conveyor belt 22. The controller 38 then sends a signal to the adjustment motor 32 which rotates to lower the end 40 of the non-drive pulley 28 and move the conveyor belt 22 in the direction A (i.e., to the direction right in FIG. 2). After a predetermined amount of time, the lateral sensor 34 again tries to detect the presence of the edge 36 of the conveyor belt 22. If the edge 36 of the conveyor belt 22 is detected, no further adjustment is needed. If the edge 36 of the conveyor belt 22 is not detected, the adjustment motor 32 rotates again to lower the end 40 of the non-drive pulley 28 to again move the conveyor belt 22 in the direction A. This is repeated until the edge 36 of the conveyor belt 22 is detected by the sensor 34 in the desired location. Although two sensors 34 and 35 are disclosed for the conveyor belt 22, it is to be understood that only one sensor can be employed.

Figure 3:
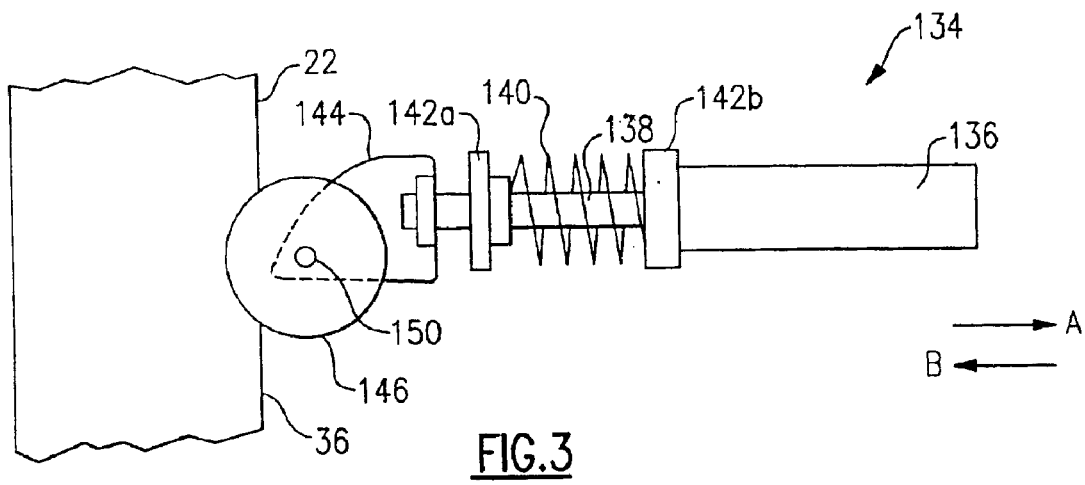
FIG. 3 schematically illustrates a side view of a second example of a lateral sensor.
Figure 4:
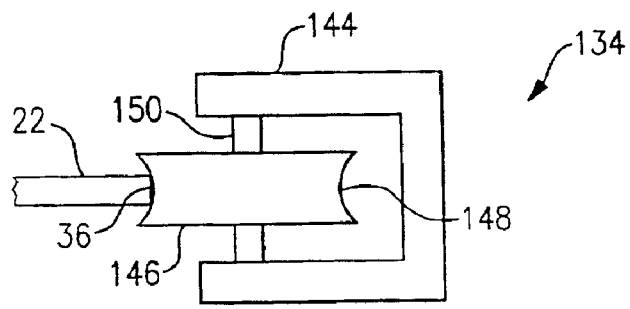
FIG. 4 schematically illustrates a top view of a second example of a lateral sensor.
Figure 5:
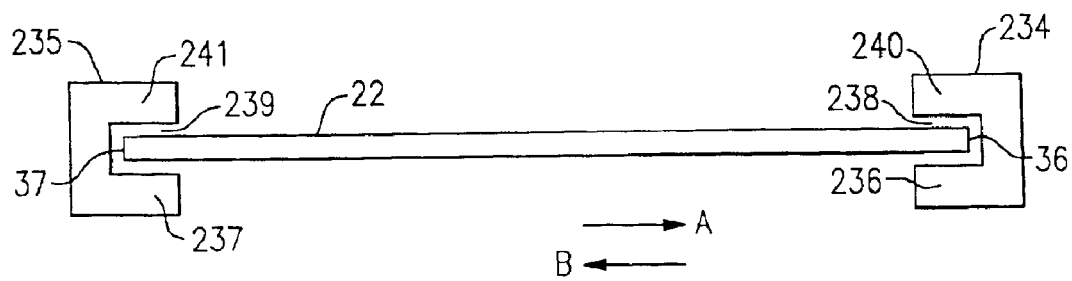
FIG. 5 schematically illustrates a side view of a third example of a lateral sensor.

FIGS. 3 and 4 illustrate a second example of a lateral sensor 134. The lateral sensor 134 includes a proportional sensor 136, such as a linear variable displacement transducer or a linear potentiometer, having a shaft 138. A spring 140 is positioned between a pair of washers 142a and 142b on the shaft 138 and provides resistance to a yoke 144. A rotatable wheel 146 having a groove 148 is secured to the yoke 144 by a rod 150. In one example, the rotatable wheel 146 is ½ inch in diameter and has a thickness of ⅛ inch to accommodate the conveyor belt 22 dimensions. The groove 148 contacts the edge 36 the conveyor belt 22.

The proportional sensor 136 determines if the edge 36 of the conveyor belt 22 has moved laterally by monitoring the resistance in the spring 140. If the edge 36 of the conveyor belt 22 moves in the direction A, the yoke 144 responsively compresses the spring 140, increasing the resistance In the spring 140. The controller 38 receives a corresponding indication from the proportional sensor 136 and responsively sends a signal to the adjustment motor 32, to raise the end 40 of the non-drive pulley 28 and laterally adjust the conveyor belt 22 a proportional amount in the direction B. Alternatively, if the edge 36 of the conveyor belt 22 moves in the direction B, the yoke 144 responsively expands the spring 140, decreasing the resistance in the spring 140. The controller 38 receives a corresponding indication from the proportional sensor 136 and responsively sends a signal to the adjustment motor 32 to lower the end 40 of the non-drive pulley 28 and laterally adjust the conveyor belt 22 a proportional amount in the direction A. As shown in FIG. 3, the axis of the spring 140 is substantially perpendicular to the direction of movement of the conveyor belt 22.

The proportional sensor 136 determines if the edge 36 of the conveyor belt 22 has moved laterally by monitoring the resistance in the spring 140. If the edge 36 of the conveyor belt 22 moves in the direction A, the yoke 144 responsively compresses the sprig 140, increasing the resistance in the spring 140. The controller 38 receives a corresponding indication from the proportion sensor 136 and responsively sends a signal to the adjustment motor 32 to raise the end 40 of the non-drive pulley 28 and laterally adjust the conveyor belt 22 a proportional amount in the direction B. Alternatively, if the edge 36 of the conveyor belt 22 moves in the direction B, the yoke 144 responsively expands the spring 140, decreasing the resistance in the spring 140. The controller 38 receives a corresponding indication from the proportional sensor 136 and responsively sends a signal to the adjustment motor 38 to lower the end 40 of the non-drive pulley 28 and laterally adjust the conveyor belt 22 a proportional amount in the direction A.

Figure 6:
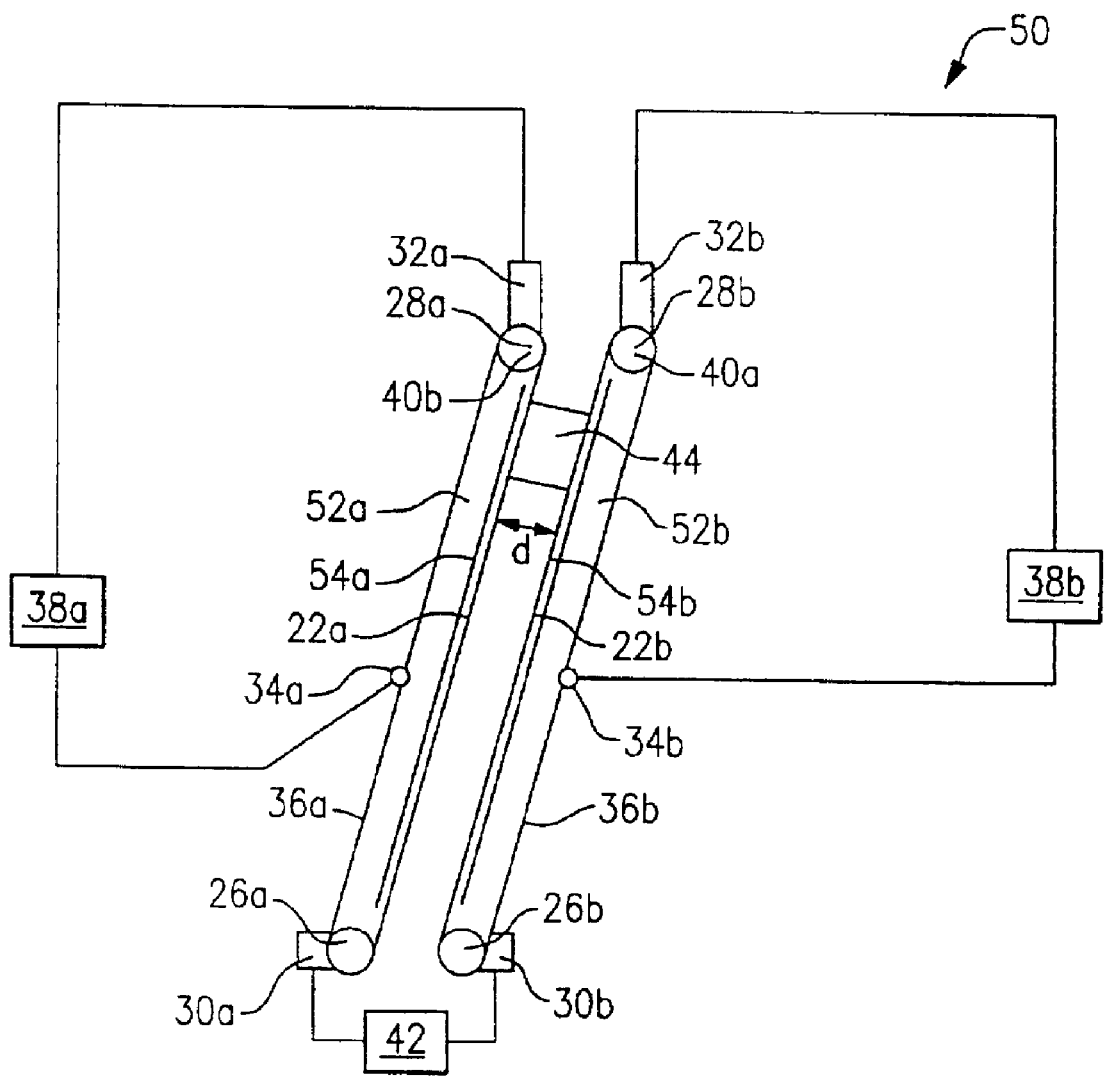
FIG. 6 schematically illustrates a side view of a grill employing the lateral sensor of the present invention.

The conveyor belt 22 can be employed on a grill to cook food. FIG. 6 illustrates a schematic example of a grilling component 50 including two conveyor belts 22a and 22b which cooks food items 44. The grilling component 50 includes a pair of grilling structures 52a and 52b separated by a gap d. Each respective grilling structure 52a and 52b includes a heater 54a and 54b, a drive pulley 26a and 26b, and a non-drive pulley 28a and 28b. A conveyor belt 22a and 22b is positioned around each of the grilling structures 52a and 52b. The heater 54a and 54b in one example grill is at a temperature of 400° F. The drive pulleys 26a and 26b are powered by respective drive motors 30a and 30b to move the conveyor belts 22a and 22b, creating a surface that travels over the heaters 54a and 54b. The non-drive pulleys 28a and 28b are each controlled by a respective adjustment motor 32a and 32b. A drive controller 42 provides a control signal to the drive motors 30a and 30b to synchronize the speed of the conveyor belts 22a and 22b. As the food items 44 travel in the gap d between the conveyor belts 22a and 22b, the food items 44 are grilled by the heater 54a and 54b under the conveyor belts 22a and 22b.

A lateral sensor 34a and 34b is positioned proximate to the respective edges 36a and 36b of the conveyor belts 22a and 22b to continually monitor the position of the edges 36a and 36b. As shown in FIG. 6, if lateral movement is detected by the lateral sensors 34a (i.e., the conveyor belt 22a is moving into the page as shown in FIG. 6), a controller 38a sends a signal to the adjustment motor 32a. The adjustment motors 32a rotates to lower the end 40a of the non-drive pulley 28a to return the conveyor belt 22a to the desired position.

If lateral movement is detected by the lateral sensor 34a (i.e., the conveyor belt 22b is moving into the page in FIG. 6), a controller 38b sends a signal to the adjustment motor 32b. The adjustment motors 32b rotates to lower the end 40b of the non-drive pulley 28b to return the conveyor belt 22b to the desired position. A lateral sensor (not shown) can also be positioned on the opposite edge (not shown) of the conveyor belts 22a and 22b to detect lateral movement in the opposing lateral direction (i.e., out of the page in FIG. 6).

The lateral sensor of the present invention can be used with an automated grill, such as described in co-pending patent application Ser. No. 10/24629 entitled "Automated grill" filed on Apr. 17, 1802.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An endless member system comprising:

a moveable endless member including an edge;

a motor to move said endless member in a first direction;

a sensor positioned proximate to said edge of said endless member to detect movement of said endless member from a desired position in a second direction perpendicular to said first direction, and said sensor includes a wheel which contacts said edge of endless member;

a drive pulley driven by said motor;

a non-drive pulley;

an adjustment mechanism to control said non-drive pulley and to return said endless member to said desired position, and said adjustment mechanism moves and end of said non-drive pulley when said sensor detects movement of said endless member in said second direction to return said endless member to said desired position;

a heater to heat a portion of said endless member; and a resilient member, and said wheel is operatively attached to said resilient member, and a level of tension in said resilient member indicates an amount of movement of said endless member in said second direction, and wherein said resilient member has an axis, and said axis of said resilient member is perpendicular to said first direction of said endless member.

2. The system as recited in claim 1 wherein said endless member is a conveyor belt.

3. The system as recited in claim 1 further including a second sensor and an opposing edge, and said second sensor is positioned proximate to said opposing edge of said endless member to detect movement of said endless member from said desired position in a third direction opposite to said second direction.

4. The system as recited in claim 1 further including a controller, and wherein said sensor sends a first signal to said controller when said sensor detects that said endless member moves from said desired position, and said controller sends a second signal to said adjustment mechanism to move said end of said non-drive pulley to return said endless member to said desired position.

5. The system as recited in claim 1 wherein said adjustment mechanism further includes an adjustment motor.

6. The system as recited in claim 5 wherein said adjustment motor moves said end of said non-drive pulley.

7. The system as recited in claim 1 wherein said adjustment mechanism raises said end of said non-drive pulley when said sensor detects that said endless member has moved in said second direction and towards said end.

8. The system as recited in claim 1 further including a second sensor and an opposing edge, and said second sensor is positioned proximate to said opposing edge of said endless member to detect movement of said endless member from said desired position in a third direction opposite to said second direction, and wherein said adjustment mechanism lowers said end of said non-drive pulley when said second sensor detects that said endless member has moved in said third direction and away from said end.

9. An endless member system comprising:

a moveable endless member having an edge and opposing edge;

a motor to move said endless member in a first direction;

a first sensor position proximate to an edge of said endless member to detect movement of said endless member from a desired position in a second direction which is perpendicular to said first direction, said first sensor including a wheel which contacts said edge of said endless member;

a second sensor position proximate to said opposing edge of said endless member to detect movement of said endless member from said desired position in a third direction which is opposite to said second direction;

an adjustment mechanism to return said endless member to said desired position;

a non-drive pulley controlled by said adjustment mechanism, and said adjustment mechanism moved an end of said non-drive pulley when one of said first sensor and said second sensor detects movement of said endless member in one of said second direction and said third direction to return said endless member to said desired position;

a heater to heat a portion of said endless member; and a resilient member having an axis perpendicular to said first direction of said resilient member, and said wheel is operatively attached to said resilient member, and a level of tension in said resilient member an amount of movement of said endless member in said second direction.

* * * * *

UNITED STATES PATENT AND TRADEMARK OFFICE
CERTIFICATE OF CORRECTION

PATENT NO. : 6,852,050 B2
DATED : February 8, 2005
INVENTOR(S) : Sands et al.

It is certified that error appears in the above-identified patent and that said Letters Patent is hereby corrected as shown below:

Column 4,
Line 67, "and" should be -- an --.

Column 6,
Line 25, "moved" should be -- moves --.
Line 35, please insert -- indicates -- after "member" and before "an".

Signed and Sealed this

Tenth Day of May, 2005

JON W. DUDAS
*Director of the United States Patent and Trademark Office*